(12) United States Patent  
Mathews

(10) Patent No.: US 8,300,393 B2  
(45) Date of Patent: Oct. 30, 2012

(54) DISPLAY DEVICE AND STAND THEREFOR

(76) Inventor: Mark O. Mathews, Surrey (GB)

( * ) Notice: Subject to any disclaimer, the term of this patent is extended or adjusted under 35 U.S.C. 154(b) by 184 days.

(21) Appl. No.: 11/884,155

(22) PCT Filed: Feb. 14, 2006

(86) PCT No.: PCT/GB2006/050037  
§ 371 (c)(1),  
(2), (4) Date: Aug. 10, 2007

(87) PCT Pub. No.: WO2006/087586  
PCT Pub. Date: Aug. 24, 2006

(65) Prior Publication Data  
US 2008/0158801 A1     Jul. 3, 2008

(30) Foreign Application Priority Data

Feb. 15, 2005   (GB) ................................. 0503150.5

(51) Int. Cl.  
*G06F 1/16* (2006.01)  
*H05K 5/00* (2006.01)  
*H05K 7/00* (2006.01)

(52) U.S. Cl. ............................... 361/679.22; 361/679.21

(58) Field of Classification Search ............ 361/679.21–679.22; 348/837; 248/917; 345/905  
See application file for complete search history.

(56) References Cited

U.S. PATENT DOCUMENTS

| | | | | |
|---|---|---|---|---|
| 5,078,021 A * | 1/1992 | Freywiss | .................... | 74/490.1 |
| 5,702,084 A * | 12/1997 | Carnahan et al. | ............. | 248/416 |
| 6,095,476 A * | 8/2000 | Mathis | .......................... | 248/422 |
| 6,102,355 A | 8/2000 | Rood | | |
| 6,113,500 A * | 9/2000 | Francis et al. | .................. | 472/60 |
| RE36,978 E * | 12/2000 | Moscovitch | ............... | 248/122.1 |
| 6,211,960 B1 * | 4/2001 | Hembree | ...................... | 356/400 |
| 6,352,226 B1 * | 3/2002 | Gordon | ...................... | 248/125.2 |
| 6,354,550 B2 * | 3/2002 | Jeong | ......................... | 248/299.1 |
| 6,655,645 B1 | 12/2003 | Lu et al. | | |
| 6,840,127 B2 * | 1/2005 | Moran | ....................... | 74/490.04 |
| 7,148,646 B2 * | 12/2006 | Matsushita | .............. | 318/568.21 |
| 7,296,774 B2 * | 11/2007 | Oh | ........................... | 361/679.27 |
| 7,377,475 B1 * | 5/2008 | Lopez | .......................... | 248/323 |
| 7,517,029 B2 * | 4/2009 | Cvek | ............................ | 312/196 |
| 7,518,508 B2 * | 4/2009 | Cvek | .......................... | 340/545.6 |
| 2004/0066612 A1 | 4/2004 | Yu | | |

FOREIGN PATENT DOCUMENTS

| | | |
|---|---|---|
| JP | 60-188982 | 9/1985 |
| JP | 11331735 | 11/1999 |
| WO | WO 00/73697 | 12/2000 |

* cited by examiner

*Primary Examiner* — Adrian S Wilson  
(74) *Attorney, Agent, or Firm* — Carmody & Torrance LLP

(57) ABSTRACT

A display device or stand therefor, intended to promote frequent changes in a (5) user's posture by the continuous movement of its display screen (1) in a horizontal and/or vertical manner. In a preferred embodiment the display device comprises a vertical hollow column (10) slidably attached by a saddle (11) to a horizontal hollow column (20). The display screen (1) is mounted on a support (30) fitted with a pivot (32) to a moveable collar (31) slidably mounted on vertical column (1). The saddle (11) and (10) collar (31) are driven by respective electric motors (41, 40). The support (30) may incorporate an arm (33) and a rotating wheel (34) running on an offset bar (35) mounted on column (10) by blocks (36, 37). Because of the pivot (32) and due to the slope of the bar (35) the display screen (1) tilts forwards or backwards as it is raised or lowered.

22 Claims, 8 Drawing Sheets

DISPLAY DEVICE AND STAND THEREFOR

CROSS REFERENCE TO RELATED APPLICATIONS

This application is a National Stage application of International Application No. PCT/GB2006/050037, filed Feb. 14, 2006.

This invention relates to a display device and stand therefor of the type that can be used in an office or other place, and incorporates a display screen to display information from a computer or other source of visual information.

Such stands are well known but are only for the use of holding the display device in a fixed position, although adjustment of height and tilt of the display may be possible.

An increasing problem for people who use such devices is the risk of physical strain or even injury due to the static nature of the use of such equipment where the user may sit in the same position for many hours at a time. These problems include work related neck, back, shoulder and upper limb disorder and repetitive strain injury, both which can in extremis cause substantial disability.

Different items and strategies can be used to help alleviate these issues such as ergonomic chairs that support the back properly, the use of a correctly adjusted desk height, a good display that does not flicker and a well illuminated work area.

However all these aids still result in an essentially static configuration in which the user is habitually likely to take the same postures time and time again. This statification of the user's posture can, over a relatively short period of time, lead to discomfort and if not treated promptly can soon turn into real discomfort and injury.

The present invention seeks to eliminate or reduce this problem by providing means for continuously or intermittently moving at least the display screen of the display device on at least one and preferably several axes so that the user will continuously shift their position to adapt to the displacement of the display screen.

This movement on the part of the user may only be small but because of the kinematic nature of the human musculoskeletal system even small changes have the effect of preventing the body from locking into rigid positions.

Accordingly, in a first aspect this invention provides an assembly comprising a display device having means for mounting on a surface for viewing by a user, said mounting means incorporating a drive arrangement including drive means operable to move the display screen of the display device on at least one axis.

In a second aspect, this invention provides an assembly comprising a stand for a display device, said stand having means for supporting the display device, and means for mounting on a surface so that the display device may be viewed by a user, said mounting means incorporating a drive arrangement including drive means operable to move the display device supporting means, and hence the display screen of the display device itself, on at least one axis.

Thus it will be understood that the assembly of the invention can be constituted as the display device itself, incorporating the drive arrangement for driving the movement of the display screen. Alternatively, the assembly of the invention can be constituted simply as a stand, which has means for supporting a display device incorporating a display screen, which stand incorporates the drive arrangement for driving movement of the display device and hence the display screen when the display device is mounted on the stand. Thus, in the latter case, the stand can be used to mount a conventional commercial display monitor.

Throughout this specification the term display device is assumed to mean any device incorporating a display screen intended for viewing by a user, and includes such things as VDU's (visual display units), computer and game console monitors and televisions. The display device will also comprise means for mounting the display screen and probably, but not necessarily, electronic circuitry for driving the display screen.

Preferably the drive arrangement is such as to move the display screen on several axes simultaneously. The movement provided to the display screen may be continuous or intermittent. Switch means may also be provided for switching the drive arrangement on and off. The drive means preferably comprises one or more electric motors.

In order to provide adjustment for different users and/or medical conditions, means may also be provided for varying the speed of the movement and optionally varying the range of movement.

The surface on which the display device (or stand therefor) is mounted may be at any orientation, but a vertical (e.g. wall) or horizontal (e.g. desk) surface are the most likely.

Preferably the mounting means is made from metal which may be folded from sheet materials or cut from extruded sections, but some or all the components could be formed from plastic or other engineering materials. The drive arrangement may incorporate one or more electric motors attached to lead screws or belts and operating either in a self contained manner or by external control from a computer.

The assembly may optionally comprise a controller running a software program, for controlling the energisation of the electric motor or motors.

The parameters of movement of the display screen may be controlled either manually by the user, or directly or indirectly by means of a computer programme running on a microprocessor circuit. Such a circuit may either be built in to the assembly, or be provided externally, for example by way of a separate PC or other computing device. Use of a computer or similar microprocessor-based circuitry will enable software to be run to control the electric motors to cause the display screen to make prescribed movements.

In this way, as the user works in front of the display screen, they will be gently lead to move their head, neck and shoulders all the time that they are working in order to keep their eyes locked onto the moving display screen. The result of this is that the user will be getting a constant, gentle workout that may potentially have at least the following benefits:

1. It will keep their muscles and joints free and mobile (rather than causing them to stiffen up).
2. It will improve the circulation to and from the muscles, joints, nerves and head, thus avoiding the build up of congestion and stasis, resulting in inflammation, pain and degenerative disorders.
3. It will help to maintain mental focus and thus improve productivity and bringing about a reduction in errors.
4. The user will tire less and at the end of the day will feel very more refreshed and well.
5. It will relieve some of the monotony of various jobs and stimulate creativity.
6. It will relieve stress (a big cause of ill health amongst static workers).
7. It will enhance cardiovascular, autoimmune and intellectual functioning.
8. It will contribute to a better quality of life that will have positive knock on effects to the home, family and community at large.

In order that the invention may be better understood, two embodiments thereof will now be described by way of example only, and with reference to the accompanying drawings in which.

Figure 1:
FIG. 1 is a diagrammatic view of a user sitting at a desk operating a computer.

Referring to FIG. 1 there is shown an example situation where a conventional display screen 1 forming part of a computer is positioned on a desk 4 with a user 2 seated on a chair 3.

Figure 2:
FIG. 2 illustrates the concept of the invention using the situation shown in FIG. 1.
Figure 3:
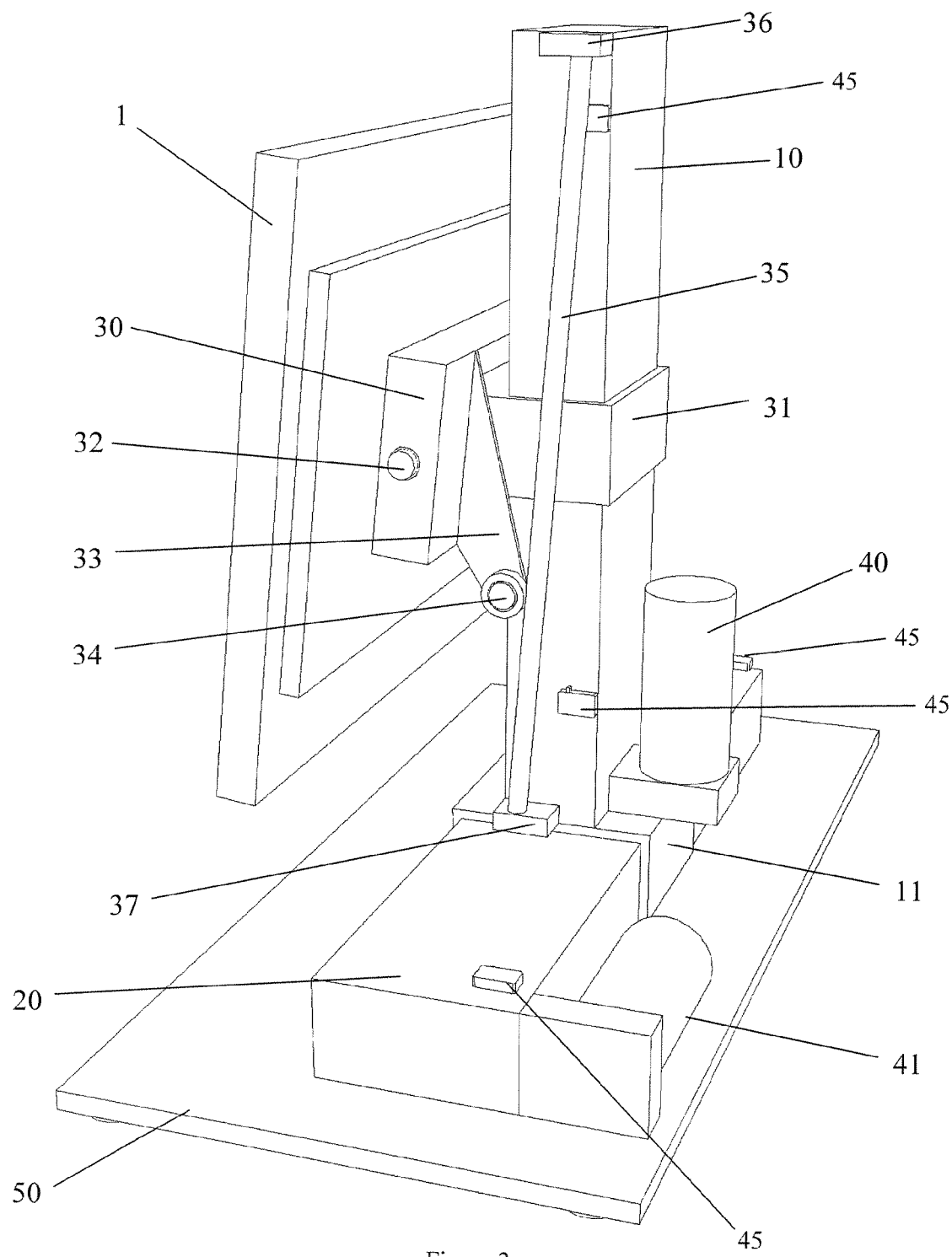
FIG. 3 is a perspective view from the rear and one side of a first embodiment of a display device according to the invention.
Figure 4:
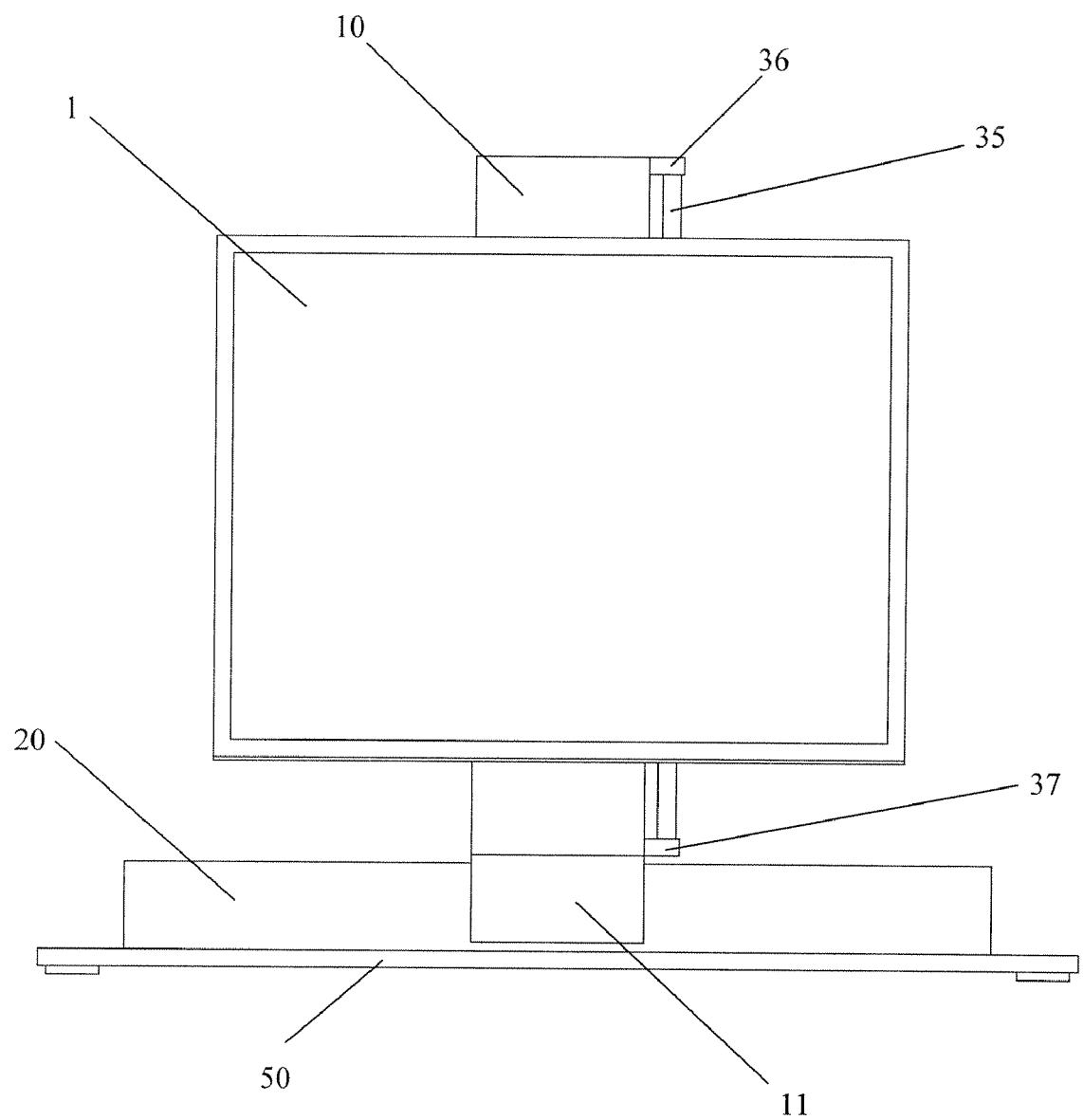
FIG. 4 is a front view of the display device of FIG. 3.
Figure 5:
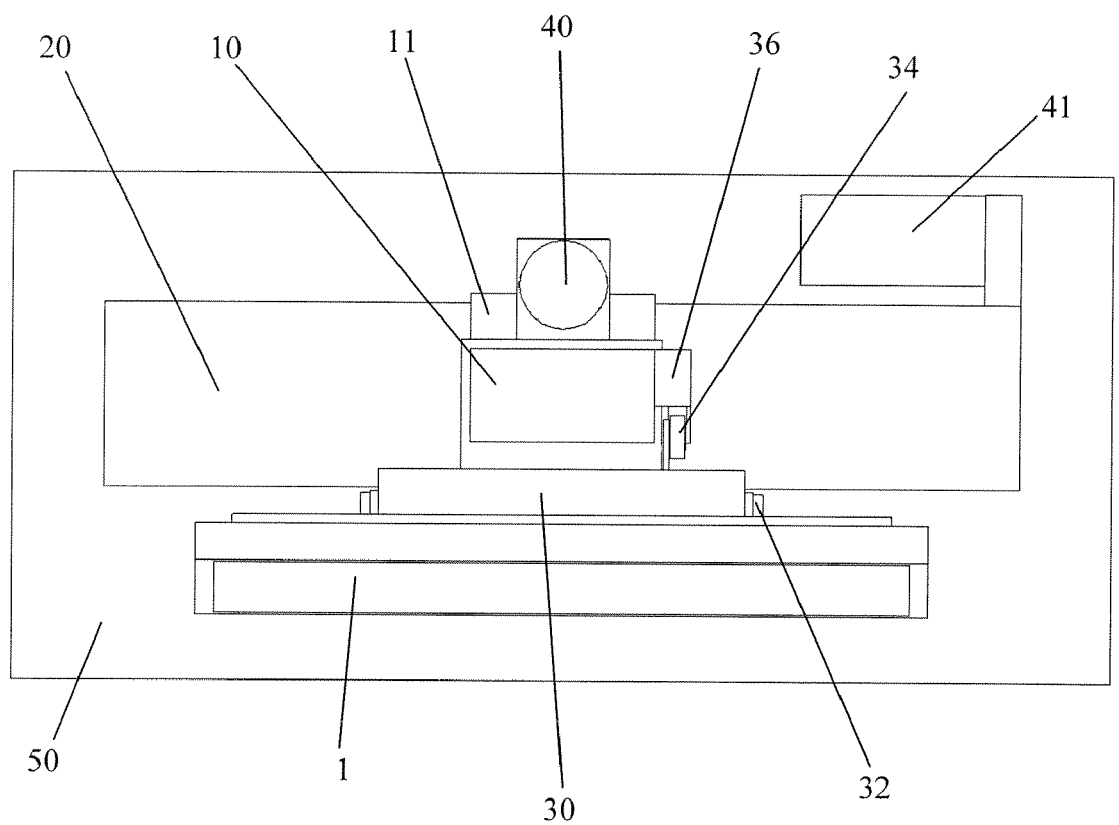
FIG. 5 is a top view of the display device of FIG. 3.
Figure 6:
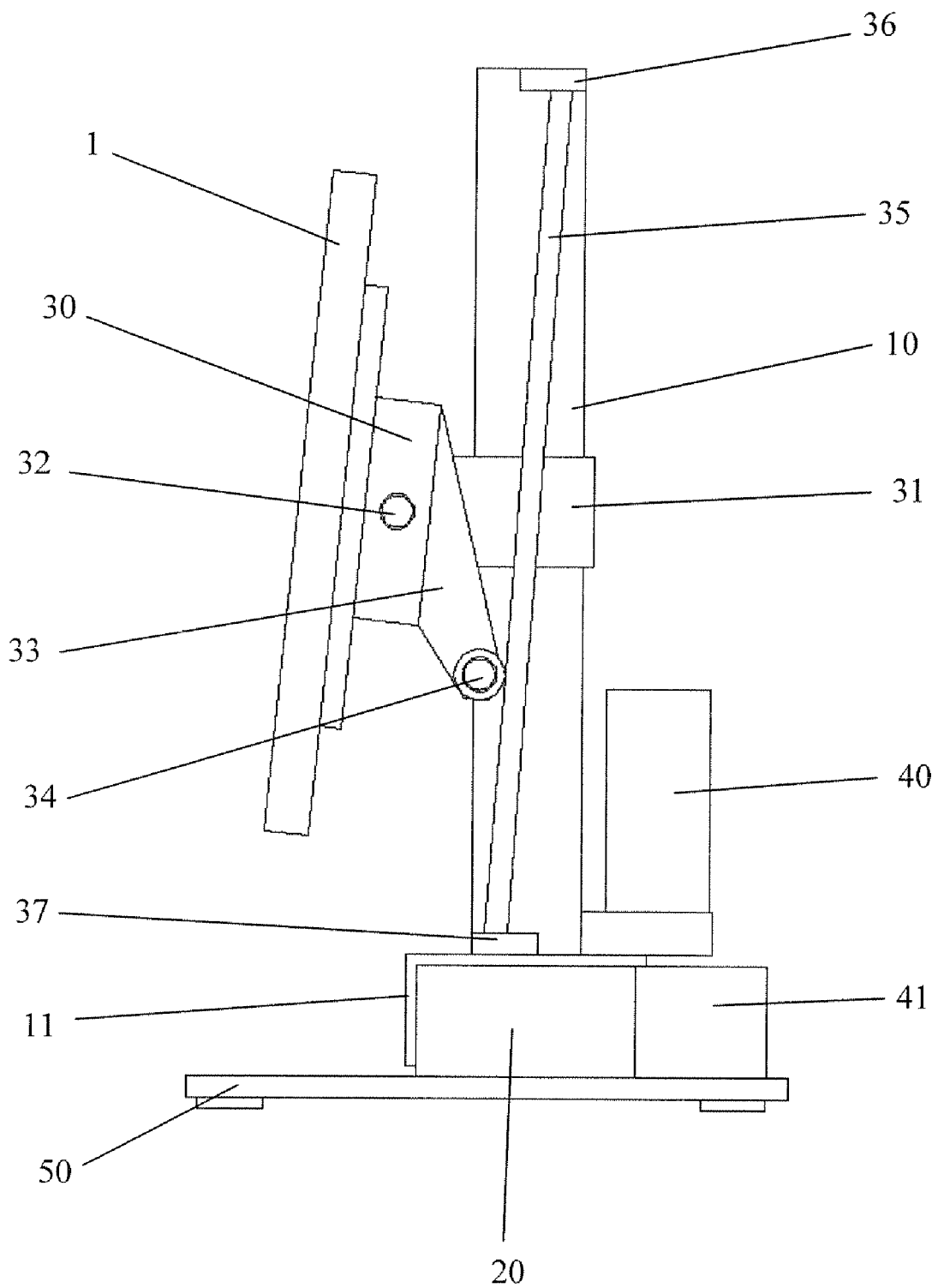
FIG. 6 is a side view of the display device of FIG. 3.

Shown in FIG. 2 is the same situation but in which arrows are used to represent movement of the display screen 1 in the vertical plane (arrow 5) and horizontal plane (arrow 6). As represented by the arrows 7 and 8, the user is encouraged to move their body and seating position as the movement of the display screen takes place.

Reference is now made to FIGS. 3 to 6 which show a first embodiment of a display device according to the invention. It will be understood that the device could be used in any situation in which a display would normally be used, such as the situation illustrated in FIGS. 1 and 2.

The display device comprises a vertical hollow column 10 attached to a saddle 11 which is horizontally slidable along a horizontal hollow column 20. The display screen 1 is mounted on a support 30 which in turn is fitted to a movable collar 31 by means of a pivot 32, to allow the display screen to rotate about the pivot. The collar 31 is slidably vertically on the column 10 and the movable collar 31 is driven by an electric motor 40 connected to an internal lead screw or belt (not visible) inside the vertical column 10. The saddle 11 is likewise driven from inside the horizontal column 20 by a second electric motor 41.

It will be seen that the electric motors 40 and 41 enable the display screen to be continuously or intermittently driven in the horizontal and vertical planes, and this may be sufficient in some circumstances. However the illustrated arrangement also provides for the angle of the display screen, to be also changed under power. This may be carried out simply to provide a rotational movement of the display screen independent of the horizontal and/or vertical movement. However, it may be advantageous to tilt the display screen 1 about pivot 32 as it moves up and down the vertical column 10 in such a way that the flat face of the display screen 1 remains at approximately the same relative angle to the user irrespective of its vertical position. Tilting of the display screen may be performed by an additional motor assembly or, as shown in this embodiment, by a mechanical interconnection between the support 30 and the vertical column 10. For this purpose an offset bar 35 is mounted to one side of the column 10 between blocks 36, 37 attached to the side of the column. As can be seen the lower block 37 is attached towards the front of the column 10 whereas the upper block 36 is attached towards the rear of the column 10 so that the bar 35 is tilted away from the vertical by a few degrees. Meanwhile, the support 30 is equipped with a bracket 33 which carries a follower 34 which bears against the bar 35, either solely due to gravity, or by spring pressure, or a combination of both. The follower 34 can take various forms, such as a wheel (as shown), or a ball bearing. It will be seen that, as the display screen 1 is raised or lowered on the vertical column 10, the offset weight of the display screen 1 presses down and because of the pivot 32 and due to the slope of the bar 35 causes the display screen 1 to tilt forwards or backwards. Adjustment of the amount of tilt relative to the moment of the display screen 1 may be obtained by adjusting the position of the wheel 34 relative to the pivot point and/or changing the angular alignment of the offset bar 35 relative to the vertical.

Furthermore, it will be clear to those skilled in the art that a similar mechanism (not shown) may be incorporated into the horizontal axis to swivel the display screen 1 so as to keep its face towards the user as the display screen 1 is moved from side to side under the power of motor 41.

The display stand mechanism is mounted on a base 50, but it may alternatively be bolted directly onto a surface in situations where it might be advantageous to have the display device firmly mounted.

The specific detail of the motor drive to the belts or lead screws and the detail of the mounting of one axis to another and to the display screen 1 is not shown as this is well understood by those practised in the art of mechanical engineering, and furthermore could be implemented in a number of different ways according to the materials and methods used in the construction of the display stand and the size of the display screen that it is designed to support and move. Furthermore, the electrical arrangements for powering the motors 40/41 are not illustrated or described since they will be readily apparent to those skilled in the art. The control of the motors can be simple or complex depending upon the circumstance and type of control desired. Two possible methods are briefly described below.

In the simplest arrangement (not shown), each driven axis has a rod with two adjustable end stops which is held in such a manner as to be able to move only in the same axis as the driven column which it is to control. The rod is held in such a manner that it can move when the saddle presses against one of the end stops, but will otherwise remain in position. This rod is used in conjunction with a switch that directly or indirectly reverses the voltage across the appropriate motor 40 or 41 and hence changes the direction that the motor is driving.

In a more complex arrangement illustrated, each column 10, 20 is fitted with individual limit detectors 45 at each end of the columns, which may be mechanical switches or solid state devices. A control circuit (not shown) detects when one of the limit detectors is reached and reverses the direction of the appropriate motor 40, 41. This control circuit may be embodied in a number of ways from simple electromechanical relays to a microcontroller which may in turn be controlled remotely by a program running on a computer.

The exact embodiment of the control of the movement of the invention would be readily apparent to those skilled in the art.

Figure 7:
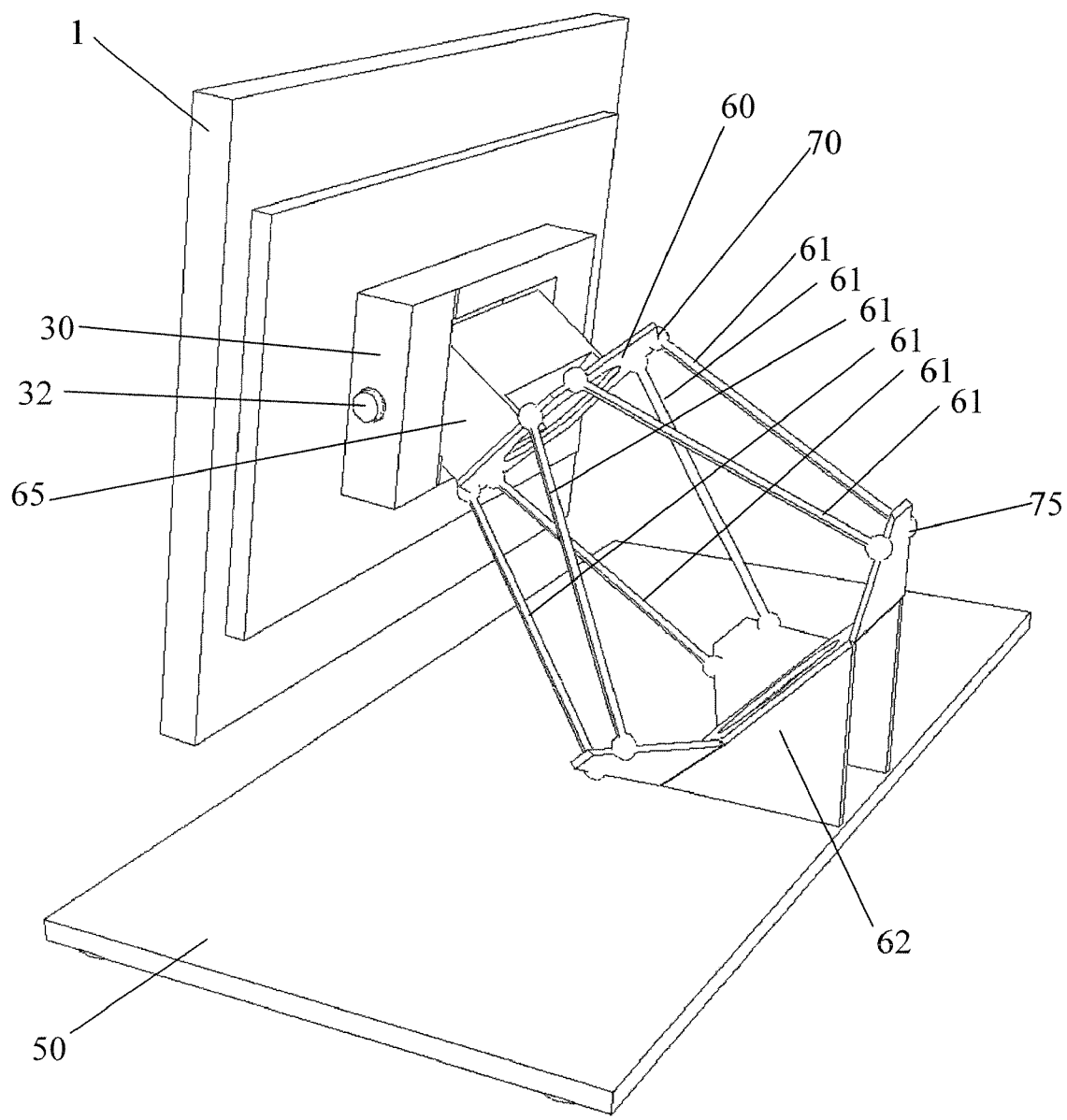
FIG. 7 is a view similar to FIG. 3, showing an alternative embodiment of the invention.
Figure 8:
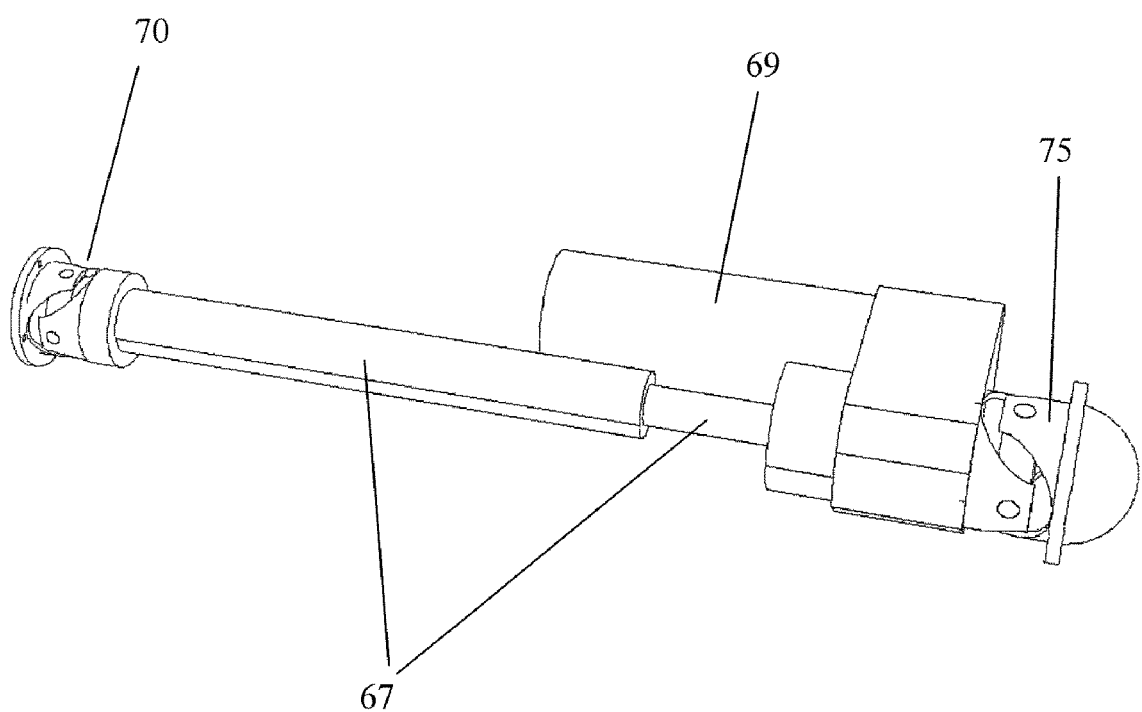
FIG. 8 is a detailed view of one of the actuators used in the embodiment of FIG. 7.

Reference is now made to FIGS. 7 and 8 which illustrate an alternative embodiment of the invention. The same reference numerals are used to represent corresponding parts in the embodiment of FIGS. 3 to 6. In the embodiment of FIGS. 7 and 8, the display screen 1 is mounted to the base 50 by a mechanical support structure incorporating a Stewart platform or equivalent mechanism. A Stewart platform is a well known positional mechanism having six degrees of freedom and was first described in a paper by D Stewart entitled "A Platform with Six Degrees of Freedom" in UK Institution of Mechanical Engineers Proceedings 1965-66, Vol 180, Pt 1, No 15, pages 371-386.. The Stewart platform is mounted on an angled mounting bracket 62 attached to the base 50. The moving platform itself is shown under reference 60 and this is supported by six linear actuators 61. Each linear actuator has a universal joint 70 at its upper end and a further universal joint 75 at its lower end, by which the linear actuators are attached to the platform 60 and mounting bracket 62 respectively. The display screen 1 is mounted on the platform 60 via a mounting block 65 which supports the pivot 32. The above-described configuration allows the platform 60 to move the display screen 1 with six degrees-of-freedom employing the fewest number of actuators 61 while maintaining stiffness by using only two-force-members (a component that is subjected only to tension and compression).

The pivot 32 allows the display screen 1 to be adjusted for a neutral tilt when the mechanism is in its home position (the home position is defined as that which the mechanism assumes when all six linear-actuators are in the fully shortened position).

The display stand mechanism can be mounted on the base 50 (as shown) or directly onto a surface which may be at any orientation, but a vertical (e.g. wall) or horizontal (e.g. desk) surface are the most likely.

Each actuator 61 is typically the same and extends or contracts, driven by an electric motor. FIG. 8 shows the linear-actuator 61 and universal joints 70 and 75 in enlarged detail. The linear actuator comprises a motor 69 which drives a lead screw 67 to lengthen and shorten the distance between the universal joints 70 and 75. The operation of the actuators, both individually and in association with the other actuators in the Stewart platform is well understood by those practised in the art of mechanical engineering, and furthermore could be implemented in a number of different ways according to the materials and methods used in the construction of the display stand and the size of the display screen that it is designed to support and move.

The embodiment shown in FIGS. 7 and 8 has greater flexibility in the manner in which the display screen is moved but requires more parts and a controller running a mathematical algorithm to calculate the simultaneous relative movements of all six actuator motors. Other methods and mechanisms for achieving the required movement of the display screen 1 relative to the base 50 (or, if mounted directly, its support surface) will be apparent to those skilled in the art.

The invention claimed is:

1. An assembly comprising a display device having means for mounting on a surface for viewing by a user, said mounting means incorporating a drive arrangement operable to move the display screen of the display device, the drive arrangement including a first means for driving the display screen in a vertical direction; a first means for rotating the display screen about a horizontal axis and a means for maintaining the display screen orientation, wherein:
the means for maintaining the display screen orientation links the first driving means to the first rotating means so as to maintain the display screen at approximately the same orientation with respect to the user as the display screen is moved vertically while in use.

2. An assembly comprising a stand for a display device, said stand having means for supporting the display device, and
means for mounting the assembly on a surface such that the display device may be viewed by a user, said mounting means incorporating a drive arrangement operable to move the supporting means and the display device when supported thereon, the drive arrangement including a first means for driving the supporting means whereby the display screen is moved in a vertical direction; and a first means for rotating the supporting means whereby the display screen is rotated about a horizontal axis and a means for maintaining the display screen orientation, wherein:
the means for maintaining the display screen orientation links the first driving means to the first rotating means so as to maintain the display screen at approximately the same orientation with respect to the user as the display screen is moved vertically while in use.

3. An assembly as claimed in claim 1, wherein the drive arrangement further includes a second means for driving the display screen in a horizontal direction and a second means for rotating the display screen about a vertical axis whereby the second driving means is linked to the second rotating means so as to maintain the display screen at approximately the same orientation with respect to the user as the display screen is moved horizontally while in use.

4. An assembly as claimed in claim 1 wherein the drive arrangement comprises at least one electric motor.

5. An assembly as claimed in claim 4 wherein:
the drive arrangement further includes a second means for driving the display screen in a horizontal direction and a second means for rotating the display screen about a vertical axis whereby the second driving means is linked to the second rotating means so as to maintain the display screen at approximately the same orientation with respect to the user as the display screen is moved horizontally while in use; and
the first driving means includes a first electric motor and the second driving means includes a second electric motor.

6. An assembly as claimed in claim 1 wherein the drive arrangement includes a Stewart platform having multiple linear actuators each driven by an electric motor.

7. An assembly as claimed in claim 4 wherein the means for maintaining the display screen orientation includes a controller running a software program for controlling the energisation of the electric motor or motors.

8. An assembly as claimed in claim 1 including means for manually controlling the parameters of movement of the display screen.

9. An assembly as claimed in claim 1 including means for controlling the parameters of movement of the display screen directly or indirectly by means of a program on an external computer device.

10. An assembly as claimed in claim 1 wherein the drive arrangement includes means for varying the speed of movement of the display screen.

11. An assembly as claimed in claim 2 wherein the drive arrangement further includes means a second means for driving the supporting means in a horizontal direction and a second means for rotating the supporting means about a vertical axis whereby the second driving means is linked to the second rotating means so as to maintain the display screen at approximately the same orientation with respect to the user as the display screen is moved horizontally while in use.

12. An assembly as claimed in claim 2 wherein the drive arrangement comprises at least one electric motor.

13. An assembly as claimed in claim 12 wherein:
the drive arrangement further includes means a second means for driving the supporting means in a horizontal direction and a second means for rotating the supporting means about a vertical axis whereby the second driving means is linked to the second rotating means so as to maintain the display screen at approximately the same orientation with respect to the user as the display screen is moved horizontally while in use; and the first driving means includes a first electric motor and the second driving means includes a second electric motor.

14. An assembly as claimed in claim 2 wherein the drive arrangement includes a Stewart platform having multiple linear actuators each driven by an electric motor.

15. An assembly as claimed in claim 12 wherein the means for maintaining the display screen orientation includes a controller running a software program for controlling the energisation of the electric motor or motors.

16. An assembly as claimed in claim 2 including means for manually controlling the parameters of movement of the display screen.

17. An assembly as claimed in claim 2 including means for controlling the parameters of movement of the display screen directly or indirectly by means of a program on an external computer device.

18. An assembly as claimed in claim 2 wherein the drive arrangement includes means for varying the speed of movement of the display screen.

19. An assembly as claimed in claim 1 wherein the means for maintaining display screen orientation comprises a mechanical interconnection for rotating the display screen about a horizontal axis with respect to vertical movement, wherein the supporting means has a pivot, the first driving means includes a vertical column, and the mechanical interconnection comprises:

a bar connected to the vertical column of the first driving means and tilted relative to the vertical column; and a follower which bears against the bar, the follower being connected to the display screen whereby in use the tilt of the bar determines the rotational position of the display screen about the horizontal axis with respect to the vertical position of the display screen.

20. An assembly as claimed in claim 19 wherein the mechanical interconnection is adapted such that the amount of horizontal tilt relative to the vertical movement is adjustable.

21. An assembly as claimed in claim 2 wherein the means for maintaining display screen orientation comprises a mechanical interconnection for rotating the supporting means about a horizontal axis with respect to vertical movement, wherein the supporting means has a pivot, the first driving means includes a vertical column, and the mechanical interconnection comprises:

a bar connected to the vertical column of the first driving means and tilted relative to the vertical column; and a follower which bears against the bar, the follower being connected to the supporting means whereby in use the tilt of the bar determines the rotational position of the display screen about the horizontal axis with respect to the vertical position of the display screen.

22. An assembly as claimed in claim 21 wherein the mechanical interconnection is adapted such that the amount of horizontal tilt relative to the vertical movement is adjustable.

* * * * *